(12) United States Patent
Manolis et al.

(10) Patent No.: US 8,145,633 B1
(45) Date of Patent: Mar. 27, 2012

(54) CONFIGURABLE ITEM FINDER USER INTERFACE

(75) Inventors: Eva Manolis, Bellevue, WA (US); Sean M. Scott, Sammamish, WA (US); Ralph Howard Edson, III, Sammamish, WA (US); R. Shawn Halpenny, Mill Creek, WA (US); Brent Allen Vincent, Seattle, WA (US); Shahzad Umar, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 581 days.

(21) Appl. No.: 12/163,922

(22) Filed: Jun. 27, 2008

(51) Int. Cl.
G06F 17/30 (2006.01)

(52) U.S. Cl. .................... 707/734; 705/26.63

(58) Field of Classification Search ............... 707/732, 707/27; 705/26.63
See application file for complete search history.

(56) References Cited

U.S. PATENT DOCUMENTS

| | | | |
|---|---|---|---|
| 5,890,175 A * | 3/1999 | Wong et al. ............... | 715/236 |
| 7,013,290 B2 * | 3/2006 | Ananian .................... | 705/26.42 |
| 7,080,070 B1 * | 7/2006 | Gavarini ..................... | 705/26.8 |
| 7,778,889 B2 * | 8/2010 | Bell et al. ................... | 705/27.1 |
| 2003/0097357 A1 * | 5/2003 | Ferrari et al. ............... | 707/3 |
| 2005/0065856 A1 * | 3/2005 | Roberts et al. .............. | 705/26 |

OTHER PUBLICATIONS

FAO Schwarz Gift Finder, http://www.faoschwarz.com, available at least as early as Jan. 2008, accessed at least as early as Jan. 2008.
CDW.com Notebook finder, http://www.cdw.com, available at least as early as Jan. 2008, accessed at least as early as Jan. 2008.

* cited by examiner

*Primary Examiner* — Rehana Perveen
*Assistant Examiner* — Scott A Waldron
(74) *Attorney, Agent, or Firm* — Knobbe, Martens, Olson & Bear LLP (57) ABSTRACT

A configurable item finder user interface (UI) is provided that helps users locate desired items within data stores of item data and item attribute data. The configurable item finder UI presents a set of selectors through which users can quickly indicate the desired attribute values. In contrast to a request-response model in which users are required to select desired values for individual attributes serially and iteratively and wait for matching results to be displayed on a page, the configurable item finder UI dynamically adjusts its result display based on user interaction with the one or more selectors. Instances of the configurable item finder UI can be configured by a content management service to be used at various times and in various locations within a deployed or third party environment.

28 Claims, 10 Drawing Sheets

CONFIGURABLE ITEM FINDER USER INTERFACE

BACKGROUND

Computerized systems are used to catalog large collections of items. For example, a library cataloging system may contain information on a large volume of books and periodicals. Similarly, a company database may contain data on a large number of items. Items in these collections may have a number of attributes that describe any salient or inherent characteristics of the items. Accordingly, attribute based navigation offers a way of browsing large collections of items by selecting attribute values of interest associated with the items and retrieving items from the catalog having such attribute values. However, users interacting with attribute based navigation systems may still need to serially and iteratively select desired value for each individual attribute (e.g. $100-$199 for product price) and browse through the results before locating items with the desired attribute values. Thus, users who interact with these data systems to navigate large collections of items need user interfaces to locate items efficiently.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

As will be used herein, the term "item" describes an object that may have a number of attributes. Data related to items and their associated attribute values may be stored in a number of data stores in various embodiments. For example, a data store may have data records relating to a number of books housed in a library. The data records may include book attributes such as title, author, publisher, publication year, etc. For example a book record may include attribute values such as "The Great Gatsby" for the title attribute, "F. Scott Fitzgerald" for the author attribute, "Penguin Popular Classics" for the publisher attribute, and so forth. In another example, a data store for a retail store may have data records relating to a number of products in its inventory. The data records may include attribute values for attributes such as name, price, color, weight, type, etc.

Embodiments are directed to a configurable item finder UI that provides a dynamic mechanism through which users can interface with data stores containing item data and item attributes. As used herein, the term "user" refers to any person who interacts with the configurable item finder UI or the supporting system disclosed herein and may include, for example, a user who may interact with an instance of the configurable item finder UI to select items for purchase or an administrative user who may interact with interfaces and components of the system that are designed to gather configuration data for the configurable item finder UI. The configurable item finder UI presents a set of selectors through which users can quickly indicate desired attribute of interest and values thereof. In contrast to a request-response model in which users are required to select an individual attribute value and wait for item results to be displayed, the configurable item finder UI dynamically adjusts its result display based on the user's interaction with the associated selectors.

For example, under the request-response model, a user who is looking for a computer from an e-commerce retailer who offers a large selection of computers may need to select desired values for attributes such as system speed, memory capacity, manufacturer, etc., in a serial fashion (i.e., one attribute at a time) until the user locates the computers that match all of the desired attribute values. In contrast, with the configurable item finder UI, the user can select desired attribute values for one or more attributes (e.g., the value of "2.5 Ghz or greater" for the attribute of "system speed" and "over 2 Gb" for the attribute of "memory capacity") and instantly see the number of computers matching the selected attribute values. In other words, instead of selecting a first attribute value, waiting for the results, and then further selecting a second attribute value and so forth, with the configurable item finder UI the user can select one or more attribute values at once and obtain matching results in response.

Furthermore, with the configurable item finder UI, if after the initial selection the user then selects different values for the attributes, the configurable item finder UI dynamically adjusts its display to show the number of computers that match the newly selected values. Thus, if the configurable item finder UI shows that 50 computers match the initial selection of "2.5 Ghz or greater" for "system speed" and "over 2 Gb" for "memory capacity" and the user then changes the "system speed" selection to "1.5 to 2.4 Ghz," the configurable item finder UI may dynamically adjust the resultant display to show that 150 computers now match the newly selected attribute values.

System Overview

Figure 1A:
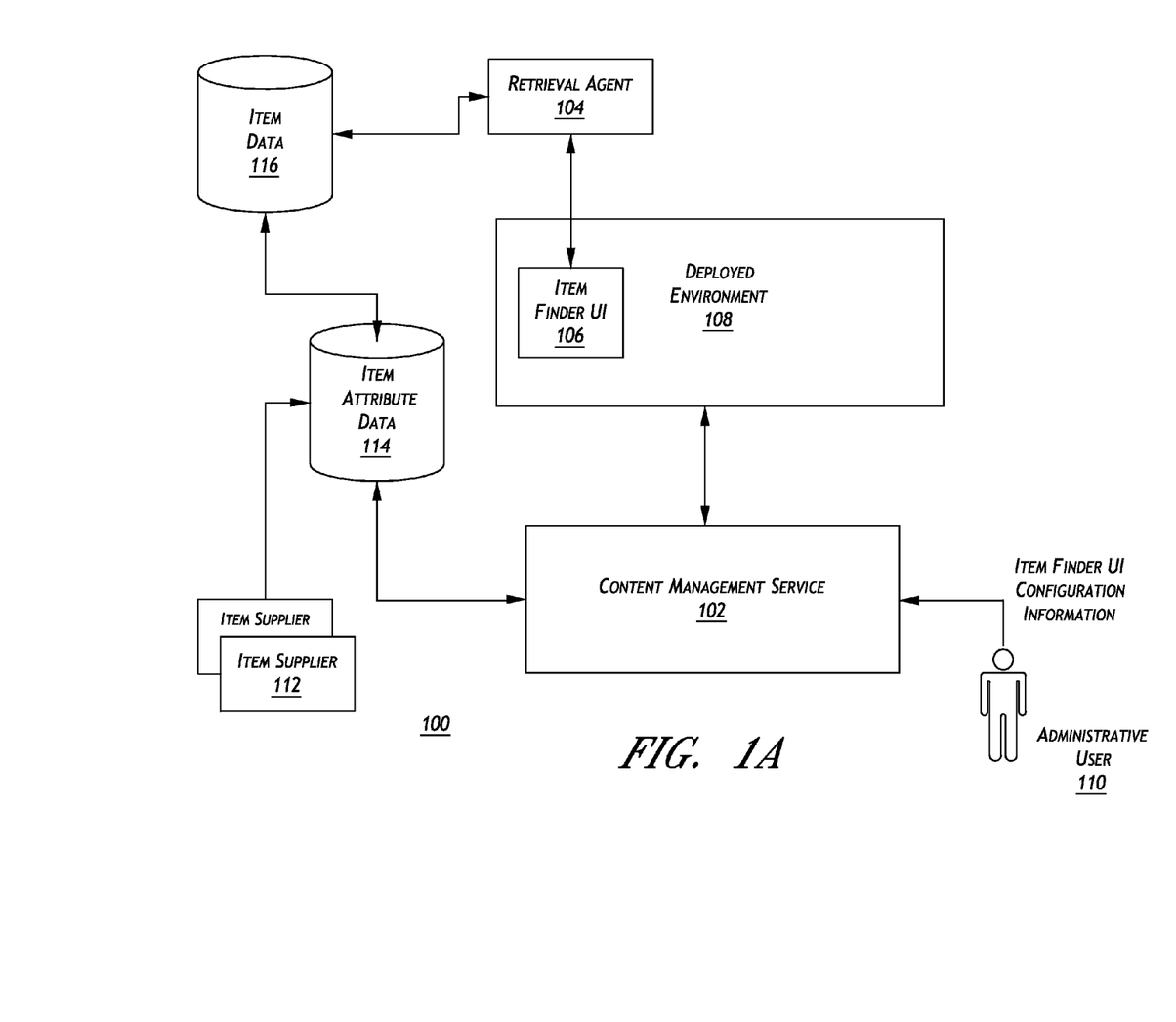
FIG. 1A is a block diagram of an illustrative system in which a configurable item finder user interface (UI) operates to enable a user to locate items of interest.

FIG. 1A is a block diagram of an illustrative system 100 in which a configurable item finder user interface (UI) 106 is used. In one embodiment, system 100 includes a content management service 102 that enables a user, such as an administrative user 110, to configure and schedule instances of configurable item finder UI 106 for use in a deployed environment 108. Deployed environment 108 may include one or more network resources (e.g., websites), one or more desktop applications, one or more mobile applications, one or more kiosk applications, and so forth.

In one embodiment, content management service 102 is a software component or web service that manages the content to be displayed in deployed environment 108. For example, content management service 102 may cause content to be displayed on various pages of a website within deployed environment 108. Content management service 102 is further configured to receive configuration data from an administrative user 110. Configuration data is used to schedule and configure instances of configurable item finder UI 106 for use in deployed environment 108. In one embodiment, the configuration data is in XML format. The configuration data may include the locations within deployed environment 108 in which instances of the configurable item finder UI 106 are to be used, the scheduling information for the various instances, and parameters governing the operation of the instances. Content management service 102 may include a number of configuration interfaces to receive such configuration data, as will be further described in conjunction with FIGS. 3A and 3B. The content management service 102 may be implemented by a single computing device (e.g., a server) or may be embodied in a plurality of devices, each executing an instance of the content management service.

In one embodiment, system 100 may include an item attribute data store 114 that may be updated periodically by one or more item suppliers 112. For example, if item attribute data store 114 stores attribute data for products or services, item suppliers 112 may be vendors who supply the products or services. As new products or services are introduced into the market, the vendors may supply updated attribute data to item attribute data store 114. As such, attribute data within item attribute data store 114 may be dynamic.

As shown in FIG. 1A, once instances of the configurable item finder UI 106 are configured, content management service 102 may retrieve item attribute data from item attribute data store 114 at scheduled runtimes. At runtime within deployed environment 108, the display of a configurable item finder UI instance is based on the configuration data provided by administrative user 110 and the item attribute data retrieved from item attribute data store 114. For example, an instance of configurable item finder UI 106 may be configured to help customers of an e-commerce retailer locate toy products while another instance may be configured to help customers locate automotive products. A toy instance may, for example, help customers locate toys by suitable age range, price, and category and an automotive instance may help customers locate automotive parts by part number, make and model of the car for which the part is used, and price. The administrative user 110 of the retailer may use content management service 102 to configure the toy product instance to display, for example, in the toy pages within deployed environment 108 and the automotive product instance to display, for example, in the automotive pages. Furthermore, instances of configurable item finder UI 106 may be configured to be displayed in deployed environment 108 at different scheduled times, or to be displayed in accordance to a set of rules that may select a particular instance from among many to be displayed based on prior customer interactions with those instances. For example, a particular instance that has generated more user interaction may be displayed more frequently.

Upon receiving a request from a user in deployed environment 108, configurable item finder UI 106 interfaces with a retrieval agent 104 to locate item data. Based on the type of user actions taken with respect to configurable item finder UI 106, retrieval agent 104 retrieves the appropriate data records from item data store 116 and returns the results to configurable item finder UI 106 for display. In the library example, the user may select a number of attribute values in configurable item finder UI 106. The results returned may include books that match the selected attribute values.

System Supporting Deployment in Third Party Environments; Web Service

Figure 1B:
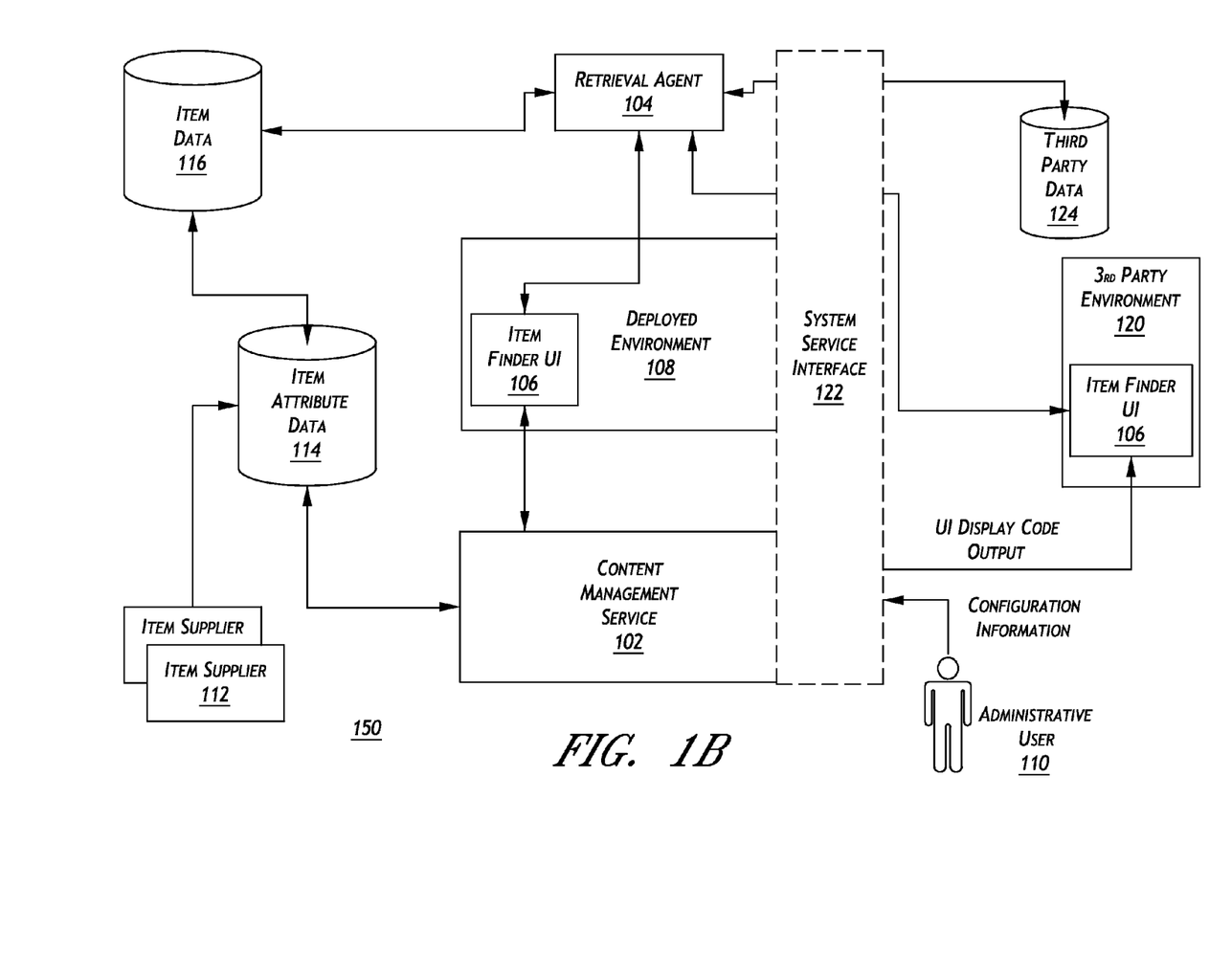
FIG. 1B is a block diagram of another illustrative system in which a configurable item finder UI operates to enable a user to locate items of interest.

FIG. 1B is a block diagram of another illustrative system 150 in which the configurable item finder user interface 106 may operate. The illustrative system 150 includes additional components that support the deployment of configurable item finder UI instances in third party environments. For example, content management service 102 may be adapted to generate and output code for displaying configurable item finder UI 106 in a third party environment 120. Third party environment 120 may be outside of system 150 and may include one or more network resources (e.g., websites), one or more desktop applications, one or more mobile applications, one or more kiosk applications, and so forth. Components of third party environment 120, however, may access components of system 150 through a system service interface 122. For example, deployed environment 108 may be an e-commerce retailer and third party environment 120 may be a network resource maintained by a different entity that may have an affiliation with the retailer. An instance of configurable item finder UI 106 running in that third party environment 120 may assist users of that network resource to find products or services sold by the retailer.

As a user interacts with an instance of configurable item finder 106 in a third party environment 120, that instance in turn interacts with retrieval agent 104 to retrieve the desired item data. In one embodiment, the interaction is facilitated through system service interface 122. Similarly, a third party administrative user may access content management service 102 through system service interface 122 to schedule and configure instances of configurable item finder UI 106.

In one embodiment, system service interface 122 operates a configurable item finder UI web service that can be used by third parties. Through system service interface 122, retrieval agent 104 may access a third party data store 124 that stores item and item attribute data, even if third party data store 124 may reside outside of system 150. Retrieval agent 104 returns result data to instances of configurable item finder UI 106 deployed in third party environment 120 in a manner as previously described. Thus, a third party that has a data store with item attribute data and a display environment may connect its system to the configurable item finder UI web service to take advantage of the configurable item finder UI in its own display environment.

Method of Configuration and Operation

Figure 2A:
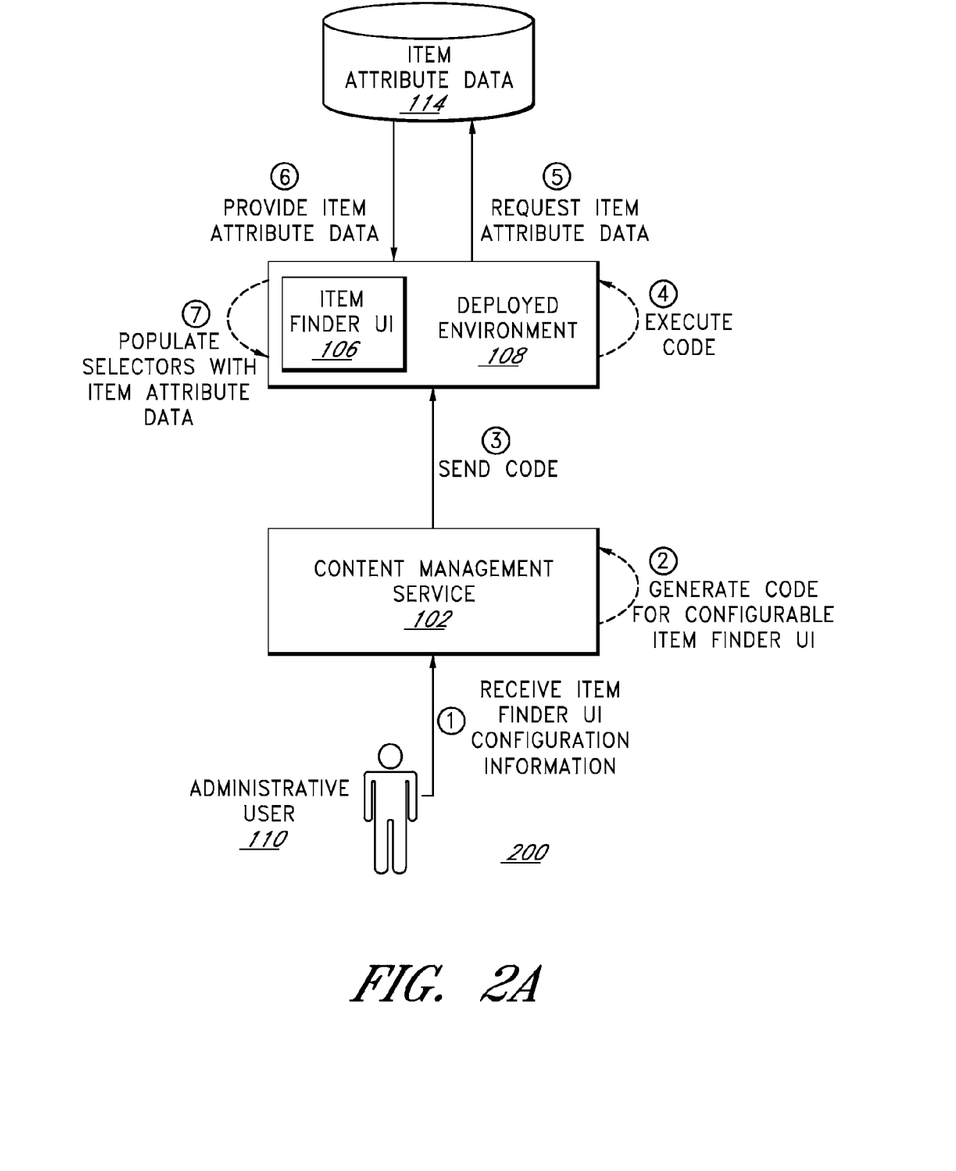
FIG. 2A is a state diagram of an illustrative method for configuring the configurable item finder UI.

FIG. 2A is a flow diagram of an illustrative method 200 for configuring the configurable item finder UI 106. Method 200 begins in state one, where content management system 102 may receive configuration data from administrative user 110 for instances of configurable item finder UI 106. In state two, content management system 102 may generate code for instances of configurable item finder UI 106. In state three, the content management service may send the generated code for instances of the configurable item finder UI 106 to deployed environment 108 or to third party environment 120. In state four, the code for an instance of the configurable item finder UI 106 may be executed within the deployed or third party environment. In state five, during the execution, item attribute data may be requested from item attribute data store 114 or third party data store 124 to populate selectors within the scheduled instance. In one embodiment, selectors are UI components through which users can select desired attribute values. For example, a configurable item finder UI instance configured for locating books may have one selector for the book title attribute, one for author, one for publication date, and so forth. In state six, the retrieved item attribute data may be provided to deployment environment 108. Finally, in state seven, the selectors within configurable item finder UI 106 may be populated with the data retrieved from the item attribute data store 114.

Figure 2B:
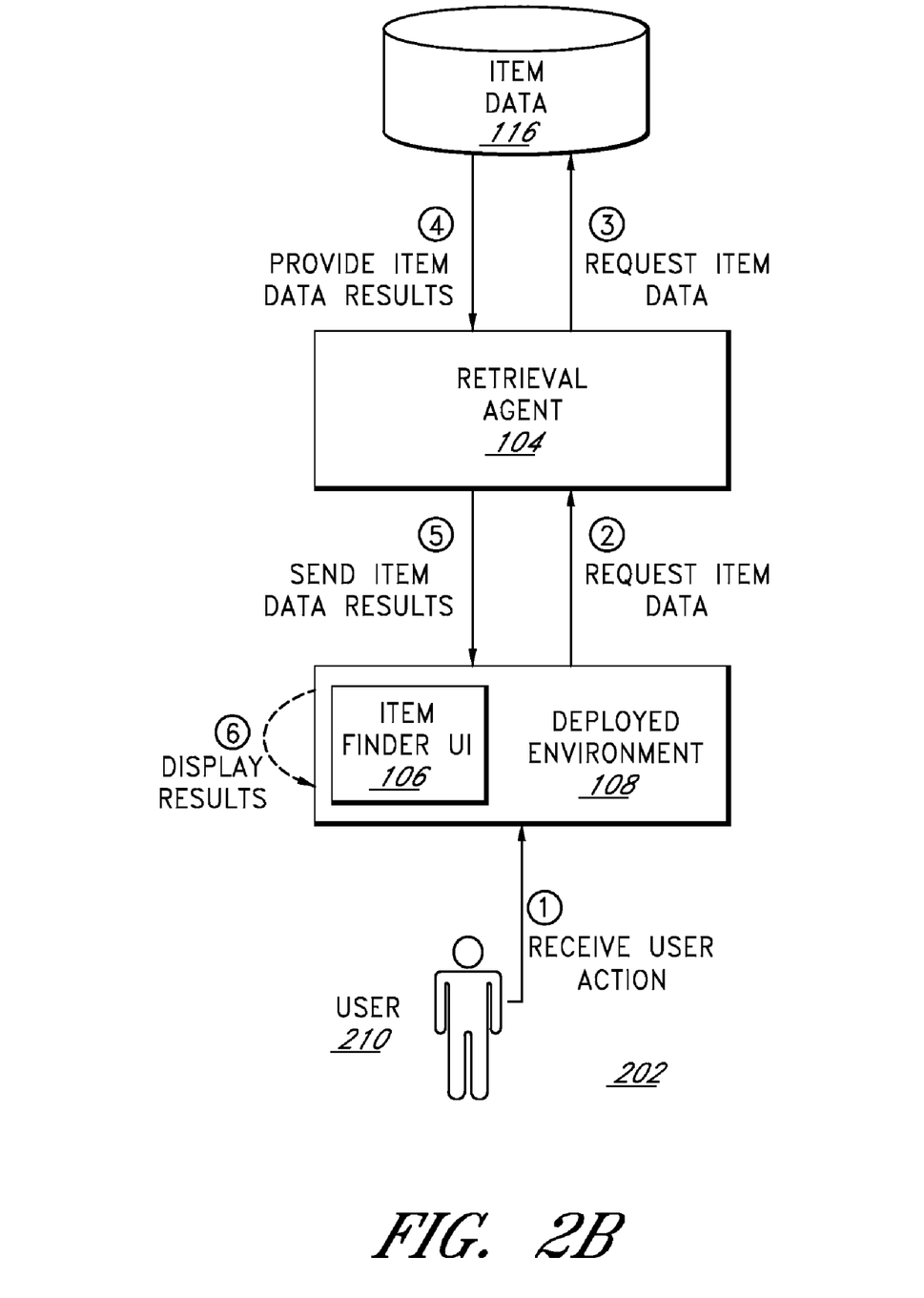
FIG. 2B is a state diagram of an illustrative method for operating the configurable item finder UI.

FIG. 2B is a flow diagram of an illustrative method 202 for operating configurable item finder UI 106. In state one, configurable item finder UI 106 may receive a user action from a user 210. For example, a user action may include selecting attribute values within one or more selectors within configurable item finder UI 106 in deployed environment 108 or third party environment 120. In state two, configurable item finder UI 106 may dynamically request item data from retrieval agent 104 in response to the user action. In state three, retrieval agent 104 may request, from item data store 116, item data that match the selected attribute values. In state four, the item data results may be provided to retrieval agent 104. In state five, retrieval agent 104 may send item data results back to configurable item finder UI 106. Then in state six, configurable item finder UI 106 may display the results. Alternatively, the results may be displayed on a different page within deployed environment 108 or third party environment 120. For example, a configurable item finder UI instance may be configured to display the number of matching items and include a user interface control for user 210 to access a different page showing details of the matching items.

Configuring the Item Finder UI

Figure 3A:
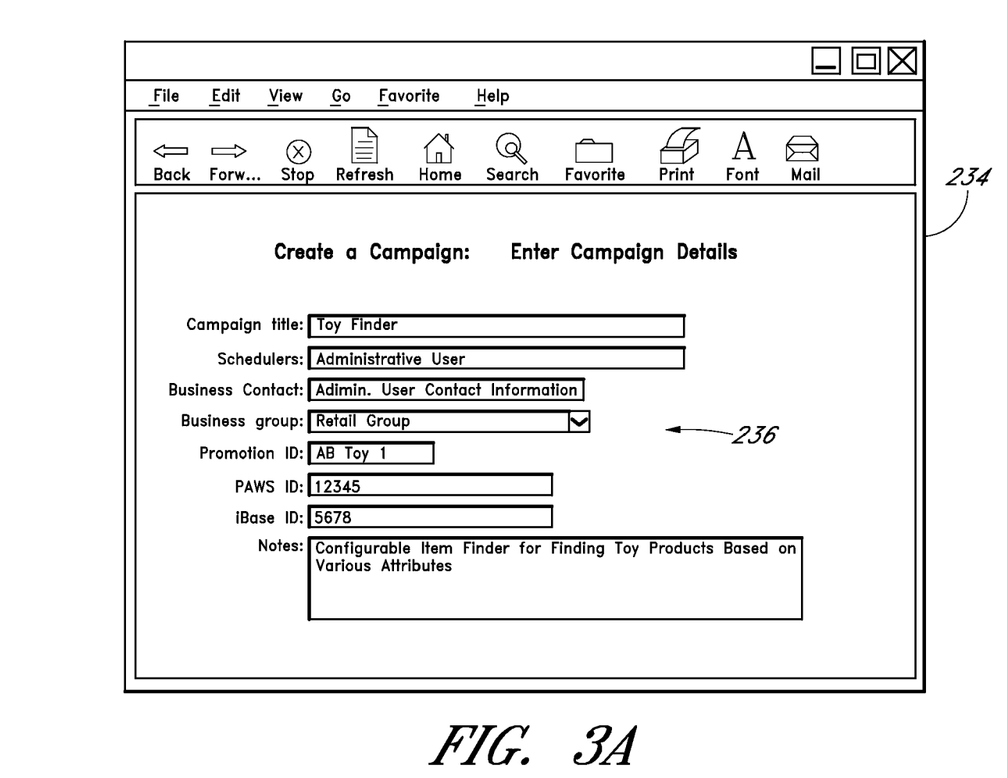
FIG. 3A is a diagram of an illustrative user interface for soliciting data to configure an item finder UI.

FIG. 3A is a diagram of an illustrative embodiment of a user interface 234 generated by the content management service 102 for soliciting data to configure instances of a configurable item finder UI 106. Such data may include basic information such as administrative user identity and various other identifiers for the UI instances. For example, as illustrated user interface 234 may include an input section 236 that may solicit the title of campaign to which an UI instance belong, the name of the administrative user who is configuring the UI instance, the contact information and business group information for the administrative user, various IDs related how the UI instance is to be classified, and notes related to the UI instance.

Figure 3B:
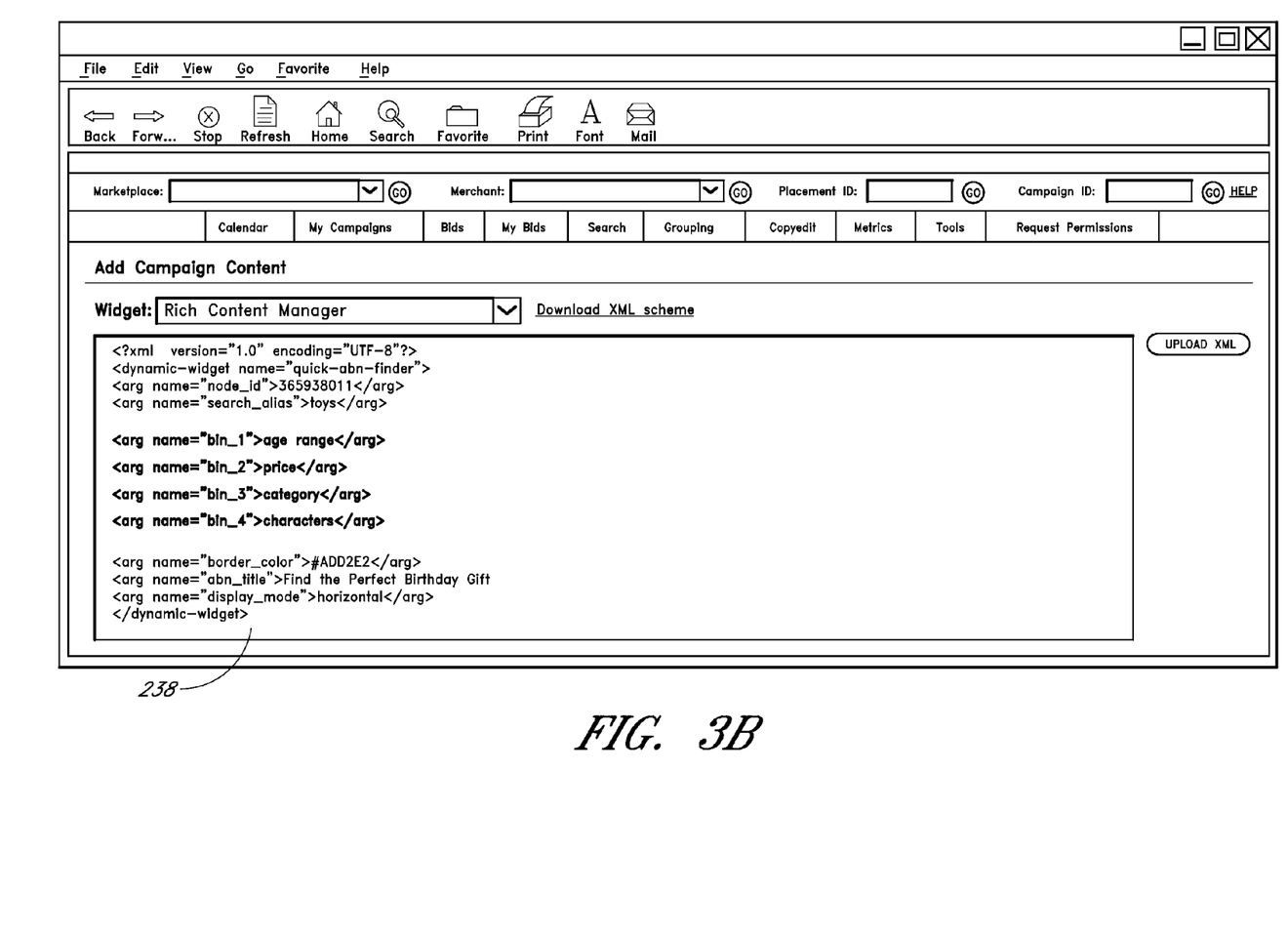
FIG. 3B is a diagram of an illustrative user interface for enabling an administrative user to input configuration data that governs the item finder UI.

FIG. 3B is a diagram of an illustrative embodiment of a user interface 238 generated by the content management service 102 for enabling an administrative user 110 to input configuration data that governs the behavior of a configurable item finder UI instance. In one embodiment, the configuration data includes code for directing content management service 102 to retrieve a particular portion of attribute data within item attribute data store 114, as depicted in FIG. 2A.

Because content management service 102 retrieves data from item attribute data store 114 when an instance of a configurable item finder UI 106 is run, the most updated data is displayed even if the underlying attribute data in the item attribute data store has changed. In other words, the configurable item finder UI 106 does not have to be recoded when the item attribute data is altered or updated. Furthermore, as discussed previously in conjunction with FIGS. 1A and 1B, configurable item finder UI 106 can also be configured for use in various portions within deployed environment 108 as well as third party environment 120. This configurability eliminates the need to code a specific UI for each type of content within a deployed environment. For example, administrative users for an e-commerce retailer can easily configure instances to be used in the "Home and Garden" section of a deployed environment as well as the "Automotive" section.

In another embodiment, instead of soliciting configuration data in the form of code, content management service 102 includes a different configuration interface that pre-retrieves item attribute data from item attribute data store 114. This interface enables administrative users, e.g., administrative user 110, to create instances of the UI by selecting, from the pre-retrieved attribute data, the attributes to be included in the selectors of the configurable item finder UI instance. In one embodiment, this interface is implemented in conjunction with the configurable item finder UI web service as described in FIG. 1B, so that a third party with its own attribute data source may use the interface to create and configure instances of the UI on its own attribute data.

In one embodiment, a default hidden attribute value can be added to the configuration data so that results are pre-filtered by a certain value. For example, an instance of the configurable item finder UI 106 may always return certain items sold by a certain seller. In another embodiment, instances of configurable item finder UI 106 may be configured to return results that are filtered by, e.g., information about the current user that has been previously gathered by the deployment environment, such as the current user's prior purchase or browsing histories, the current user's prior indication of items already owned, wish-list information previously supplied by other users who may be related to the current user, etc.

Data Model

Figure 4A:
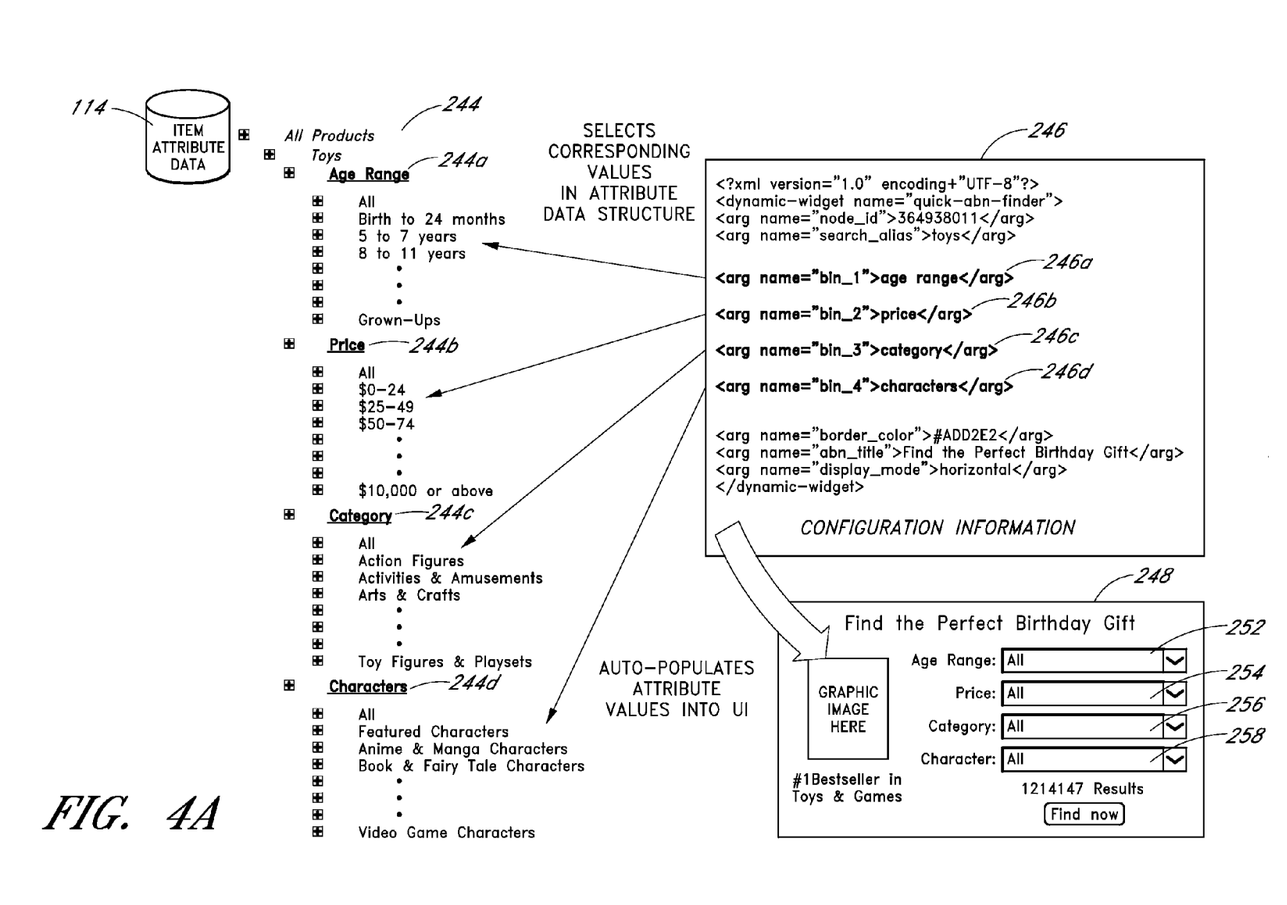
FIG. 4A shows a data model used to support an illustrative embodiment of the configurable item finder UI.

FIG. 4A is a diagram of a data model utilized to support an illustrative embodiment of configurable item finder UI 106. Data tree 244 is illustrative of the data stored in item attribute data store 114. In the example shown, data tree 244 shows a number of toy product attributes. The attributes shown are age range 244a, price 244b, category 244c, and characters 244d. Within configuration data 246, four selector arguments are supplied to match a selector, e.g., selector 248a, to each of the four attributes. Thus, the first selector 246a is configured to select based on age range 244a, the second selector 246b on price 244b, the third selector 246c on category 244c, and the fourth selector 246d on characters 244d. Although FIG. 4A depicts a data model for toy product items, those skilled in the art will recognize that the data model is equally applicable to any type of items and their related attributes. In addition, any type or number of attributes may be provided. Also, the number of selectors can be any number and do not have to correspond to the number of attributes available in the data structure of item attribute data store 114.

At runtime, each selector (e.g., selectors 252, 254, 256, and 258 of item finder UI instance 248) is populated with the corresponding values for the attributes in item attribute data store 114. For example, at runtime, a number of age range attribute values are retrieved from item attribute data store 114 and inserted into a configured instance of item finder UI 106. For example, the age ranges of "All," "Birth to 24 Months," "5 to 7 Years," "8 to 11 Years," and so forth are retrieved from item attribute data store 114 and put into the "Age Range" selector 252 within configurable item finder UI instance 248. Because the attribute values are retrieved at runtime, instances of configurable item finder UI 106 automatically receive and display updated attribute values.

Configurable Item Finder UI

Figure 4B:
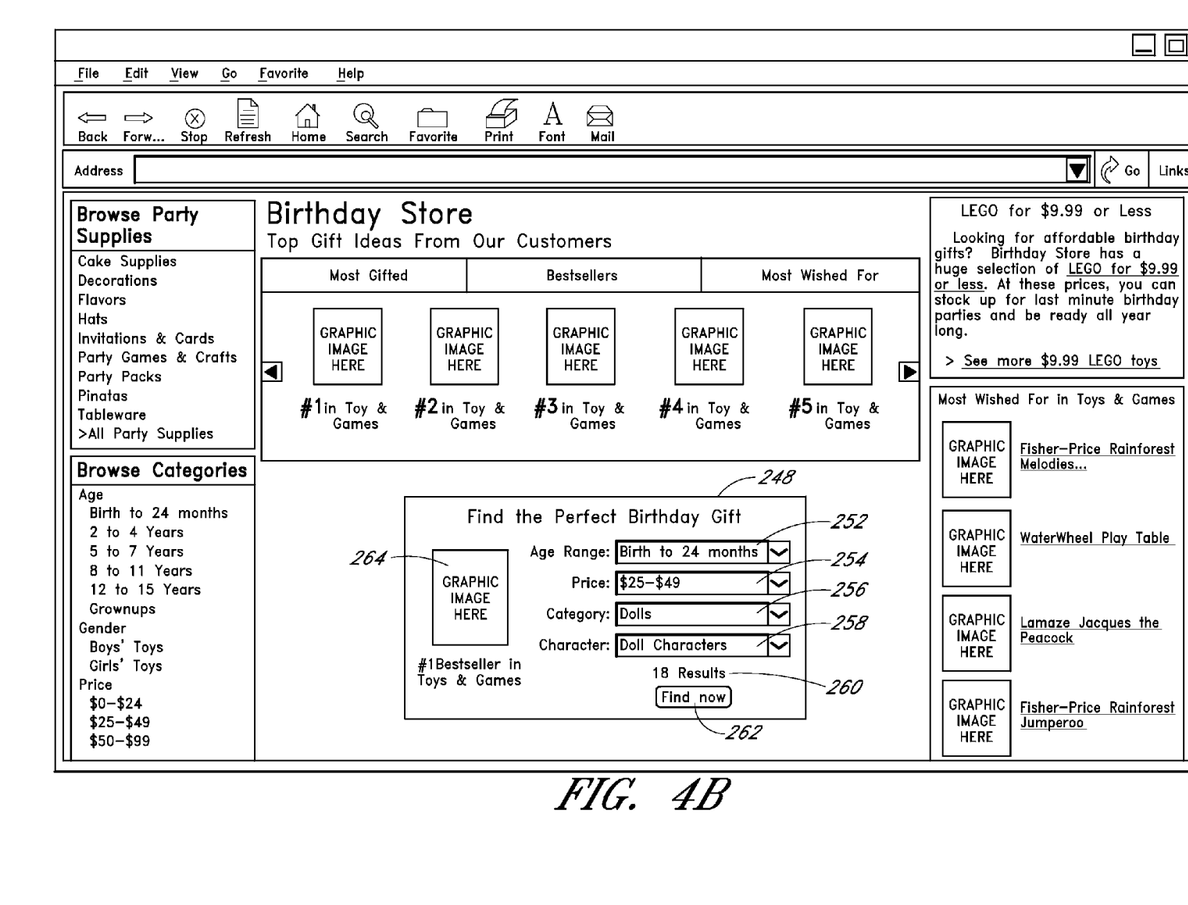
FIG. 4B shows an illustrative instance of a configurable item finder UI in a deployed environment.

FIG. 4B shows configurable item finder UI instance 248 presented within a deployed environment 108 or third party environment 120. In the illustrated embodiment, a number of selectors, e.g., 252-258, are available for users to find an appropriate toy for a birthday gift. For example, selector 252 corresponds to the "age range" attribute, selector 254 corresponds to the "price" attribute, selector 256 corresponds to the "category" attribute, and selector 258 corresponds to the "characters" attribute. A user can use these selectors to find a toy that has the desired attribute values. In the example shown, a user has selected an age range attribute value of "Birth to 24 Months." A promotional display 264 may be included as shown to promote a popular item for the specified age range. In one embodiment, promotional display 264 is an image link to a web page that contains further information about the promotional item.

As illustrated, result indicator 260 shows that there are 18 toys matching the attribute values selected in selectors 252, 254, 256, and 258. Result indicator 260 is dynamically updated as the user interacts with each selector. For example, when the user selects an age range, the number of toy products with a matching age range attribute value will be displayed. If the user selects an age range attribute value of "Birth to 24 Months," result indicator 260 may display the number of toy products that has the value of "Birth to 24 Months" for the age range attribute.

If the user subsequently selects a price, the number displayed in result indicator 260 is updated to indicate the number of toy products matching both the selected age range and price attribute values. Therefore, the user can know in advance the number of items that match the selected attribute values before submitting a query to retrieve information about the items through the "find now" user interface control 262. In one embodiment, result indicator 260 is dynamically updated through one or more AJAX calls to retrieval agent 104. The dynamic update of result indicator 260 enables users to survey the number of items with the desired attributes without having to serially and/or iteratively indicate desired values for individual attributes.

In one embodiment, retrieval agent 104 may filter out results based on prior user purchase or browsing histories, as well as other information previously collected by the deployment environment. For example, the number of items returned may be reduced by the number of items that the user has previously purchased. In another embodiment, one or more images of a selected number of matching items may be displayed in promotional display 264. For example, the top selling toy that matches the selected attribute values may be displayed in promotional display 264.

In another embodiment, besides updating result indicator 260 upon a user selection of a selector, configurable item finder UI 106 eliminates subsequent attribute values in other selectors that may return a result of zero (0) items. For example, if a user selects an age range of "Birth to 24 Months," configurable item finder UI 106 may dynamically eliminate attribute values within price, category, and characters that would yield a result of zero (0) items. For example, if all the toy items with an age range attribute value of "Birth to 24 Months" are priced under $50, the attribute values of "$50-$74," "$75-$99," and other values above $50 would be eliminated from price selector 254. Thus a user having selected an age range of "Birth to 24 Months" can quickly see the price range of the toy items that is within the age range. Conversely, if the user selects the "All" attribute value for any of the selector, configurable item finder UI 106 dynamically reverses the elimination and once again presents all available attribute values in the selectors and returns a broader set of results.

Alternate Embodiments of the Configurable Item Finder UI

Figure 5:
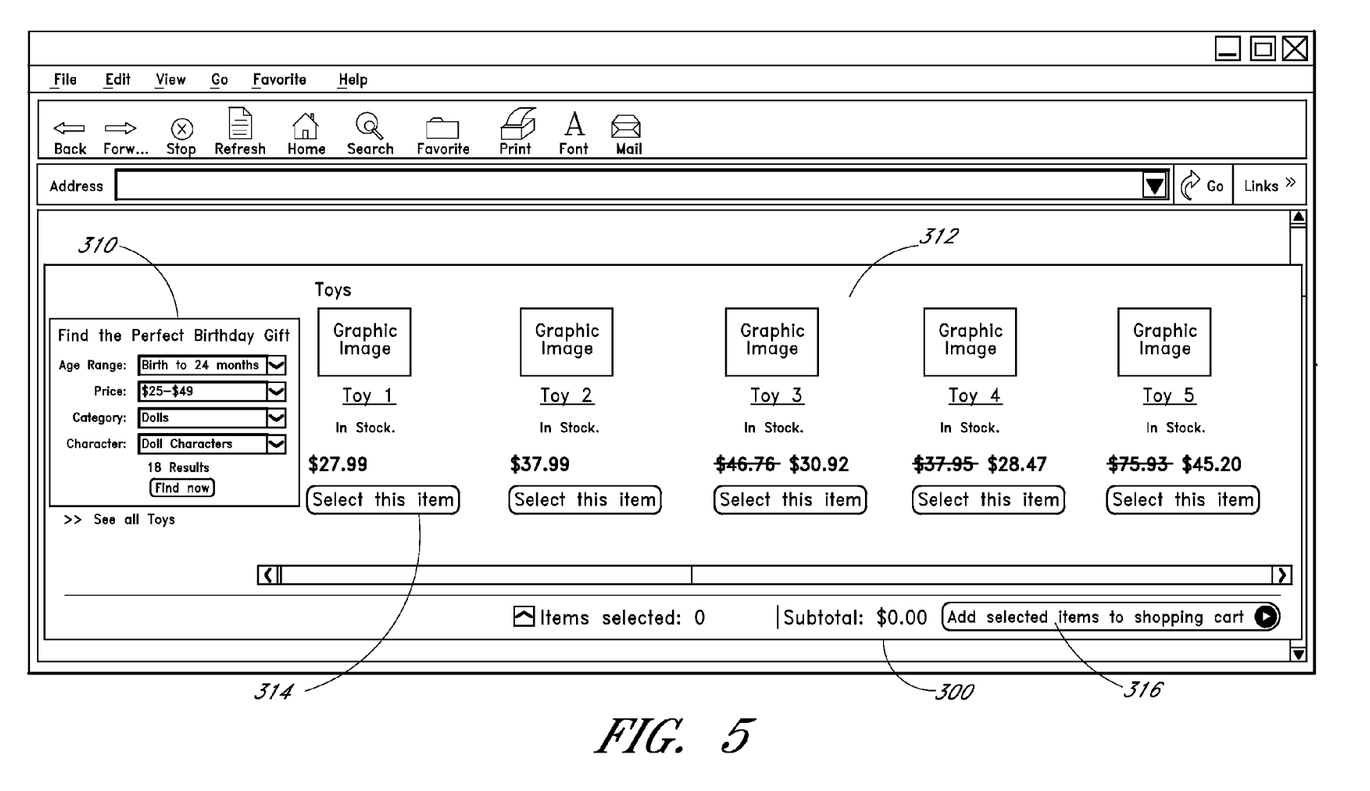
FIG. 5 is a diagram of an alternative embodiment of a configurable item finder UI.

FIG. 5 is a diagram of an alternative embodiment of a configurable item finder UI 300. However, those skilled in the art will appreciate that the configurable item finder UI may be used for any type of item or item attribute data. A number of selectors are shown within a panel 310, with each selector representing an attribute. Here, as with the illustrative embodiment shown in FIG. 4B, the selectors are configured to show possible attribute values for selecting a toy. However, in contrast to the illustrative embodiment shown in FIG. 4B, as the user interacts with the selectors, items with attribute values matching those selected in the selectors are displayed in an item display panel 312. In the example shown, toys matching the attribute values selected in the selectors within the panel 310 are displayed in the item display panel 312. More specifically, the five toys that are displayed here are five of the 18 toys that have been found to match the selected attribute values of "Birth to 24 Months" for age, "$25-$49" for price, "Dolls" for category and "Doll Characters" for characters. The other 13 of the 18 matching toys may be accessed by moving a scrollbar within the item display panel 312. In various embodiments where configurable item finder UI 300 is used in a deployed environment where items are products or services that can be purchased, each item shown within display panel 312 may include an image of the item, a brief description of the item, and a selection control 314 that enables users to include the item in a shopping cart or bin or otherwise indicate the desire to purchase the item. Optionally, the display panel 312 may include a purchase control 316 where users can purchase items previously selected.

Figure 6:
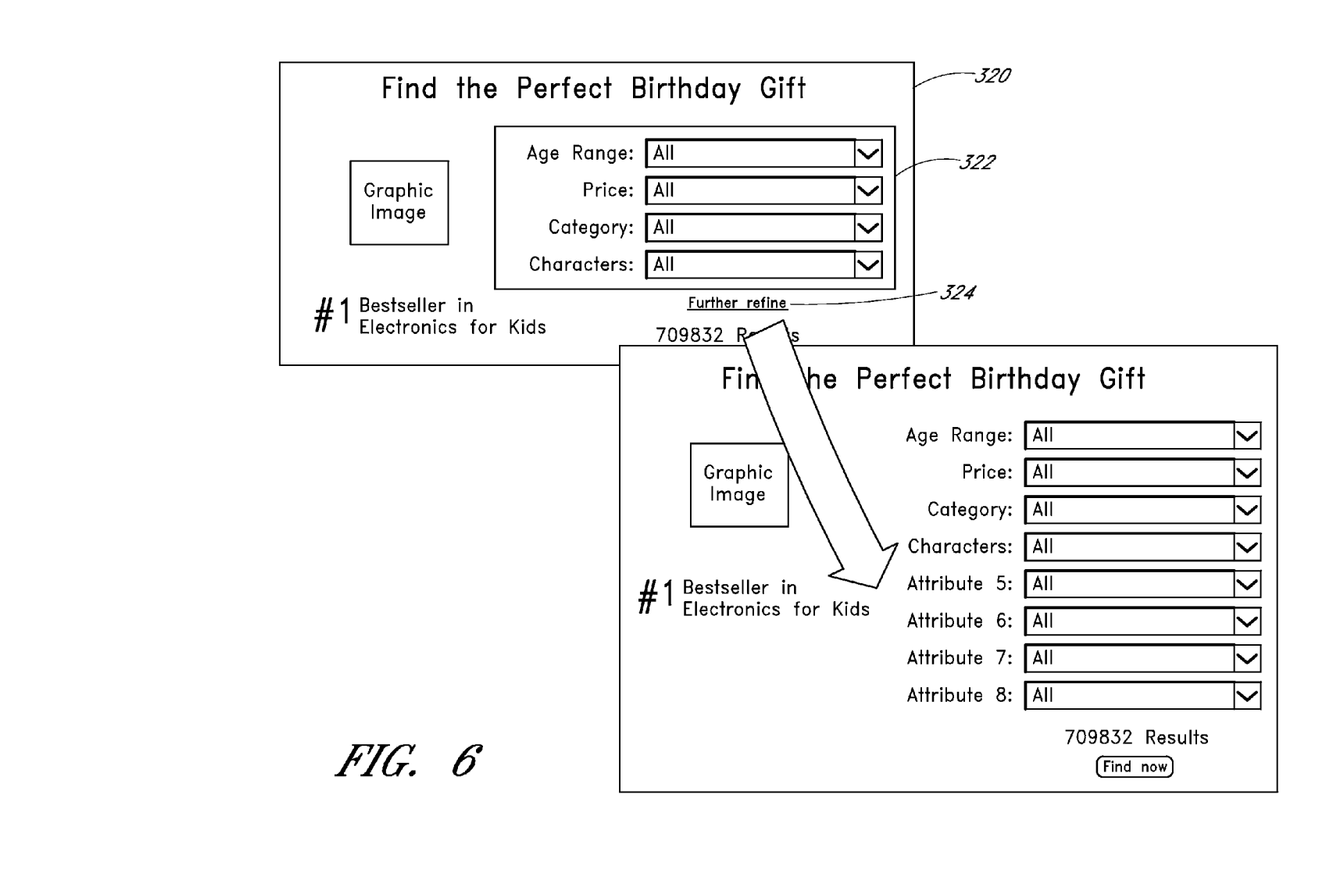
FIG. 6 is a diagram of an alternative embodiment of a configurable item finder UI.

FIG. 6 is a diagram of yet another embodiment of a configurable item finder UI 320. Configurable item finder UI 320 includes an expandable list of selectors 322. When a user selects a link 324, the list is expanded to show a number of previously hidden selectors. The user can interact with the selectors to retrieve the desired items.

All of the methods and processes described above may be embodied in, and fully automated via, software code modules executed by one or more general purpose computers or processors. The code modules may be stored in any type of computer-readable medium or other computer storage device. Some or all of the methods may alternatively be embodied in specialized computer hardware. In addition, the components referred to herein may be implemented in hardware, software, firmware, or a combination thereof.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for presenting items to a user, the system comprising:
    a data store that stores item data;
    a computing device in communication with the data store that is operative to:
        receive configuration data for an item finder user interface, the configuration data comprising data related to:
            a type of user interface for the item finder user interface, the user interface type being selected from a plurality of user interface types, each user interface type being configured for a corresponding type of item referenced by the item data, and each user interface type including at least one user interface element populated by an attribute value for the corresponding type of item; and
            at least one of: (1) a location in which the item finder user interface is used within a deployed environment, and (2) scheduling information for the item finder user interface,
        wherein the item finder user interface comprises:
            one or more selectors from which a user selects an attribute value for use in retrieving items that correspond to the selected attribute value; and
            a result indicator that is dynamically updated upon the user's selection of an attribute value from the one or more selectors, wherein the result indicator reflects information regarding items that correspond to the attribute value selected from the one or more selectors;
        configure the item finder user interface with the configuration data for use in the deployment environment; and
        deploy the item finder user interface in the deployment environment;
    a retrieval agent that, upon selection of the one or more selectors from the deployed item finder user interface, retrieves item data corresponding to the selected attribute value from the data store, and
    a data store that stores item attribute data,
    wherein the computing device is further operative to populate, upon a deployment of the item finder user interface in the deployment environment, the one or more selectors of the item finder user interface with an attribute value obtained from the item attribute data store.

2. The system of claim 1, wherein the computing device is further operative to deploy a plurality of instances of the item finder user interface.

3. The system of claim 1, wherein the retrieval agent filters the retrieved items based on a default attribute value.

4. The system of claim 1, wherein the retrieval agent filters the retrieved items based on previously gathered information about the user.

5. The system of claim 1, wherein the deployed environment comprises a third party environment.

6. The system of claim 5, wherein the data store stores item data provided by a third party.

7. A non-transitory, computer-readable medium having a computer-executable user interface module for enabling a user to locate items, the computer-executable user interface module comprising:
    one or more selectors from which the user selects an attribute value for use in locating items, wherein each selector is dynamically provided with the attribute value retrieved from an attribute data store for selection; and
    a result indicator that is dynamically updated upon the user's selection of an attribute value from the one or more of the selectors, wherein the result indicator reflects information regarding items that correspond to the attribute value selected from the one or more selectors,
    wherein the computer-executable user interface module is deployed within a deployment environment, and
    wherein the computer-executable user interface module is configured based on configuration data comprising data related to a type of user interface module selected from a plurality of user interface module types, each user interface module type being configured for a corresponding type of item referenced by item data stored in a database configured to provide data for the user interface module, and each user interface module type including at least one user interface element populated by an attribute value for the corresponding type of item.

8. The computer-readable medium of claim 7, wherein the information reflected by the result indicator comprises a number of items that correspond to the selected attribute value.

9. The computer-readable medium of claim 7 further comprising an item display of information about at least one item that corresponds to the selected attribute value.

10. The computer-readable medium of claim 9, wherein the item display comprises an image associated with the at least one item.

11. The computer-readable medium of claim 7, wherein the deployment environment comprises a third party environment.

12. A computer-implemented method for implementing a user interface that enables a user to retrieve items, the method comprising:
    receiving configuration data for a user interface from which a user selects one or more attribute values, each attribute value corresponding to at least one attribute, wherein the attribute values are used in retrieving corresponding items, the configuration data comprising data related to:
        at least one display rule related to selection, for display, of an instance of the user interface from among a plurality of user interface instances, the selection of the user interface instance being based at least in part on prior user interactions with previously displayed user interface instances;
    generating code in accordance with the configuration data for displaying the user interface in a deployment environment, the configuration data further including at least one of code for implementing the user interface, information related to a location within the deployed environment for the user interface, scheduling information for deploying the user interface, and a parameter for operation of the user interface;
    retrieving the attribute values for inclusion in the user interface for display in the deployment environment; and
    providing the code for the displaying the user interface to the deployment environment in accordance with the at least one display rule.

13. The computer-implemented method of claim 12 further comprising providing code for displaying a plurality of instances of the user interface.

14. The computer-implemented method of claim 13 further comprising selecting a particular instance of the user interface for display in the deployed environment.

15. The computer-implemented method of claim 12, wherein the deployed environment comprises a third party environment.

16. The computer-implemented method of claim 12 further comprising, upon selection of a value from the deployed user interface, retrieving item data corresponding to the selected attribute values.

17. The computer-implemented method of claim 16 further comprising filtering the retrieved item data on based on previously gathered information about the user.

18. The computer-implemented method of claim 16 further comprising filtering the retrieved item data on a default attribute value.

19. The computer-implemented method of claim 12, wherein the attribute values are retrieved when the user interface is displayed in the deployment environment.

20. The computer-implemented method of claim 12, wherein the attribute values are retrieved prior to display of the user interface in the deployment environment.

21. A system for presenting items to a user, the system comprising:
 a data store that stores item data; and
 a computing device in communication with the data store that is operative to:
  receive configuration data for an item finder user interface, the configuration data related to a type of user interface of the item finder user interface, the user interface type being selected from a plurality of user interface types, each user interface type being configured for a corresponding type of item referenced by the item data, and each user interface type including at least one user interface element populated by an attribute value for the corresponding type of item;
 wherein the item finder user interface comprises:
  a retrieval control;
  at least one selector from which a user selects an attribute value for use in retrieving items that correspond to the selected attribute value; and
  a result indicator that is dynamically updated following a user selection of the at least one selector and without a user action with the retrieve control, the result indicator reflecting result information from the data store that corresponds to the selected attribute value;
 configure the item finder user interface with the configuration data for use in a deployment environment; and
 deploy the item finder user interface in the deployment environment.

22. The system of claim 21 further comprising a retrieval agent that, upon selection of the selector from the deployed item finder user interface, retrieves item data corresponding to the selected attribute value from the data store.

23. The system of claim 22, wherein the computing device is further operative to deploy a plurality of instances of the item finder user interface.

24. The system of claim 21 further comprising a data store that stores item attribute data.

25. The system of claim 24, wherein the computing device is further operative to configure the item finder user interface to populate the selector with an attribute value obtained from the item attribute data store.

26. The system of claim 21, wherein the deployed environment comprises a third party environment.

27. The system of claim 26, wherein the data store stores item data provided by a third party.

28. The system of claim 21, wherein the configuration data includes at least one of code for implementing the item finder user interface, information related to a location within the deployed environment for the item finder user interface, scheduling information for deploying the item finder user interface, and a parameter for operation of the item finder user interface.

* * * * *